United States Patent [19]

Stenberg et al.

[11] Patent Number: 4,910,992
[45] Date of Patent: Mar. 27, 1990

[54] RIVET INSTALLATION TOOL AND BLIND RIVETS FOR USE THEREWITH

[76] Inventors: Sven E. J. Stenberg, Uddbergsvägen 33, S-773 00, Fagersta, Sweden; Curt G. Nordström, 21 Bergslagsvägen S-773 00, Fagersta, Sweden

[21] Appl. No.: 251,998

[22] Filed: Sep. 30, 1988

Related U.S. Application Data

[63] Continuation of Ser. No. 893,242, Aug. 5, 1986, abandoned.

[30] Foreign Application Priority Data

Aug. 14, 1985 [SE] Sweden .................. 8503802
Jul. 3, 1986 [SE] Sweden .................. 8602966

[51] Int. Cl.[4] .............................. B21D 9/05
[52] U.S. Cl. .......................... 72/391; 72/114; 72/453.17
[58] Field of Search .............. 72/114, 391, 453.17, 72/454; 29/253.43

[56] References Cited

U.S. PATENT DOCUMENTS

| | | | |
|---|---|---|---|
| 3,197,987 | 8/1965 | Martin | 72/114 |
| 3,412,594 | 11/1968 | Lund | 72/391 |
| 3,838,588 | 10/1974 | Johnson | 72/114 |
| 3,906,776 | 9/1975 | Humphreys et al. | 72/391 |
| 4,070,889 | 1/1978 | DeCaro | 72/114 |
| 4,085,337 | 4/1978 | Moeller | 72/391 |

*Primary Examiner*—David Jones
*Attorney, Agent, or Firm*—Cushman, Darby & Cushman

[57] ABSTRACT

A tool for drawing blind rivets, especially self-drilling ones, provided with upsetting pins. The tool is intended to be attached to the driving axle (2) of a hand tool (1) and includes a nozzle (8) with a throughbore (9) of such a design that a blind rivet inserted therein is turned when the driving axle (2) is rotated in one direction. A drawing device (10, 12) draws off the upsetting pin of the rivet when the driving axle (2) is rotated in an opposite direction.

2 Claims, 5 Drawing Sheets

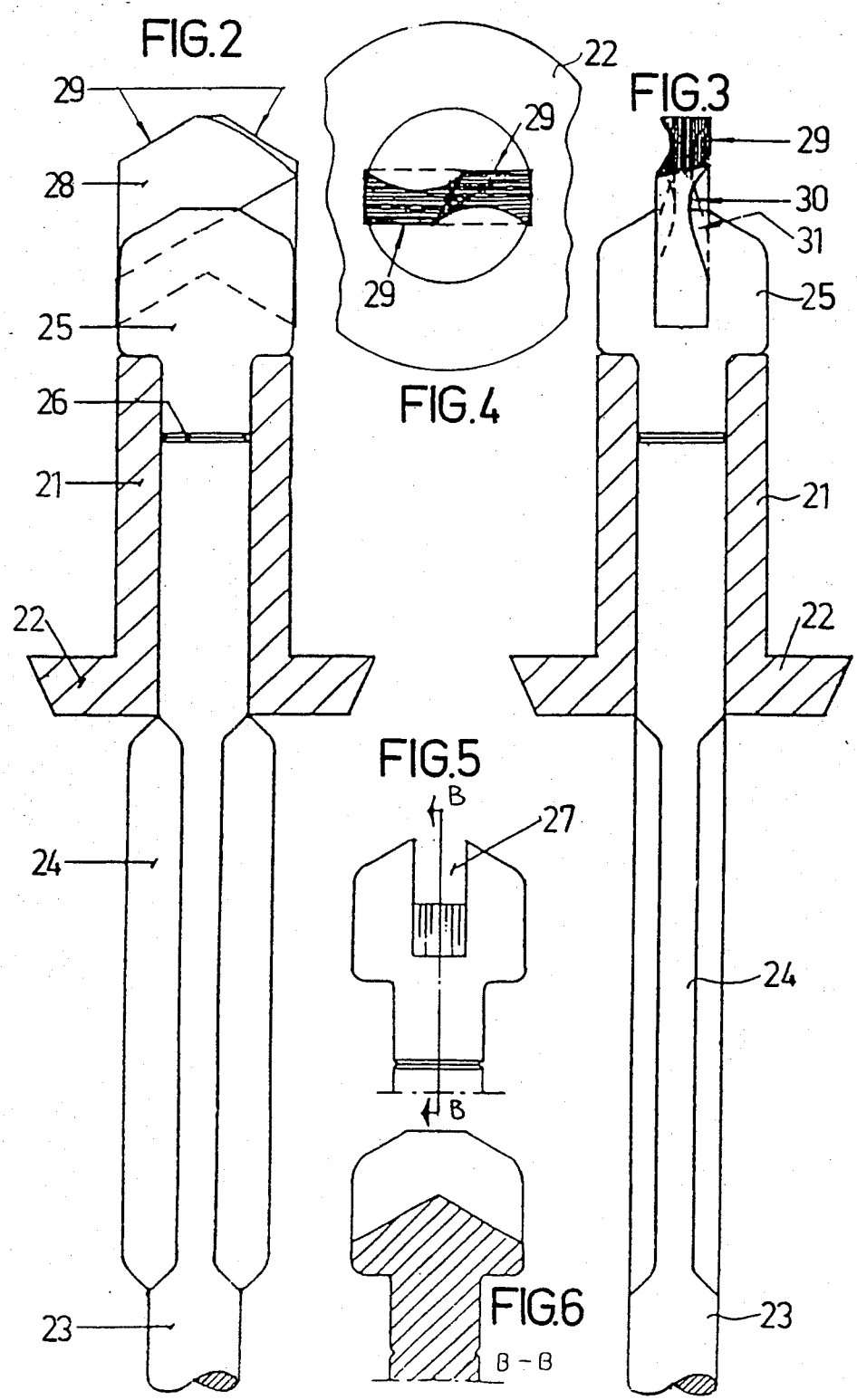

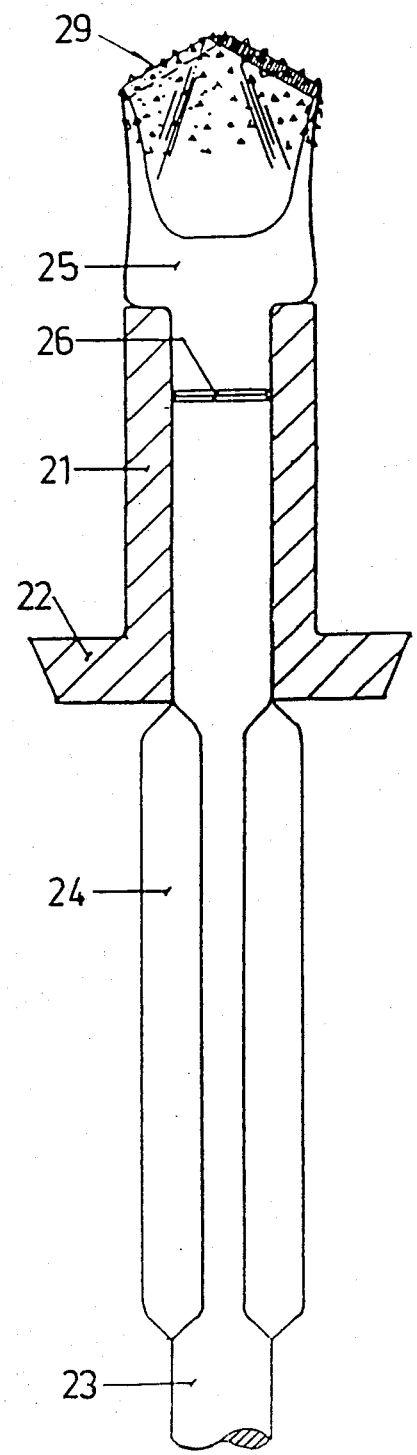
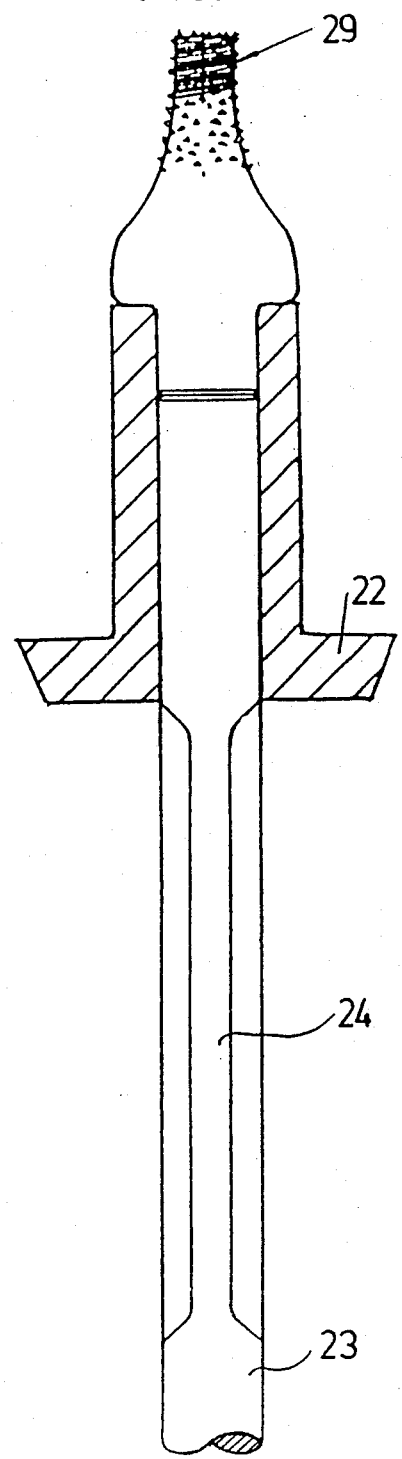

FIG.13
FIG.14
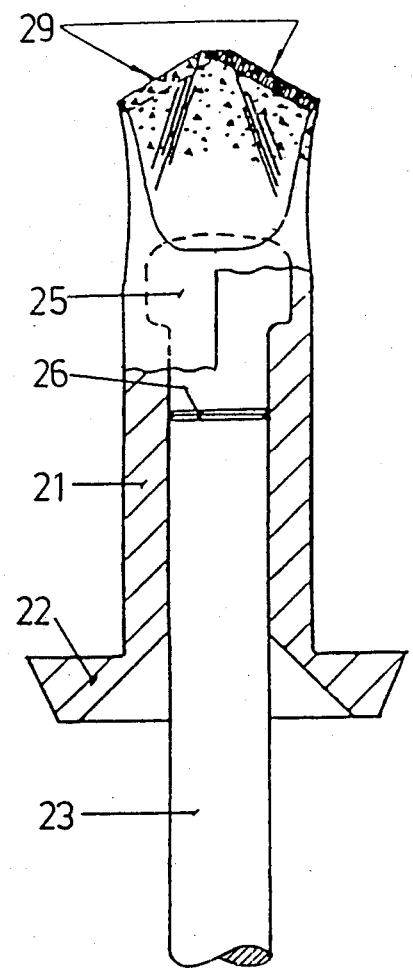
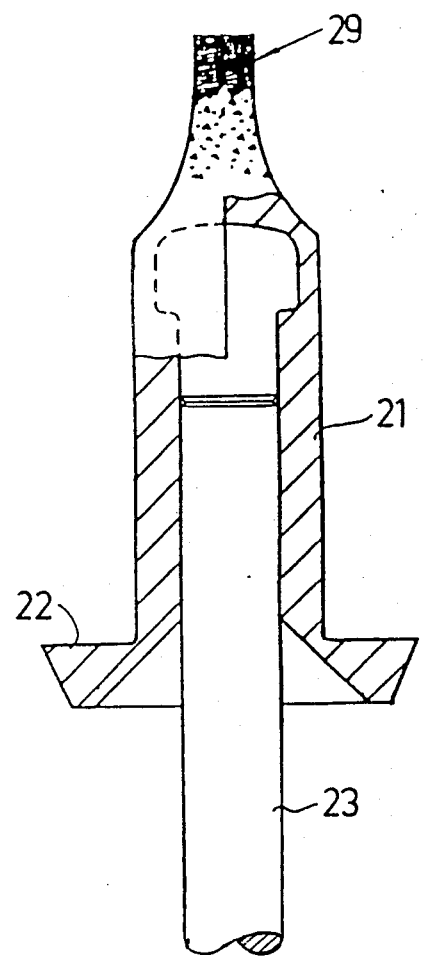

RIVET INSTALLATION TOOL AND BLIND RIVETS FOR USE THEREWITH

This is a continuation of application Ser. No. 06/893,242, filed Aug. 5, 1986 which was abandoned upon the filing hereof.

This invention relates to a tool intended to be used for drawing of blind rivets provided with upsetting pins but which can also be used for drilling and screw driving. The invention also relates to a self-drilling blind rivet intended to be used in the tool of the invention. The tool of the invention can be used for riveting of conventional pop rivets but is preferably intended for use with a self-drilling blind rivet of pop rivet type, the rivet being inserted with its upsetting pin into the tool, a rivet hole being drilled and riveting being carried out by drawing off the upsetting pin of the rivet, tearing off this and drawing out the remaining pin from the upset attached rivet. All these operations can be carried out by a tool of the invention in one sequence without any change of tool.

BACKGROUND AND SUMMARY OF THE INVENTION

When riveting by means of so-called pop rivets a hole is first drilled by means of a drilling machine in the workpiece after which the tool is changed and riveting is carried out with hand tongs or possibly hydraulically or pneumatically operated riveting machines. This work will be time-consuming, as drilling must first be carried out by means of a machine, and tools must then be changed to carry out riveting either by hand power or heavy and complicated riveting tools.

It is therefore the object of this invention to provide a small, light and handy tool in which self-drilling rivets can be used and so that riveting, tearing off and extraction of the rivet pin can be carried out using the same tool. Another object of the invention has been to form the tool so that it is also easy to adapt a drill to the tool and so that the tool can be used for drilling and, moreover, screw driving. A further object of the invention has been to provide a self-drilling blind rivet which is cheap in manufacture and, moreover, can also be formed with an air-tight sleeve.

BRIEF DESCRIPTION OF THE DRAWINGS

The invention is now described in greater detail in the form of an illustrative example shown in the drawings where FIG. 2 is a lateral view, partly in section, of a first variant of the rivet according to the invention, FIG. 3 is a lateral view of the rivet in FIG. 2 as seen from the left in FIG. 2, FIG. 4 shows the drill point seen from the point end, i.e. from above in FIG. 3, FIG. 5 shows the end section of the upsetting pin in FIG. 2 without drill point, FIG. 6 is a section B—B of the end portion in FIG. 5, FIG. 11 is a lateral view, partly in section, of a third variant of a blind rivet according to the invention, FIG. 12 is also a lateral view, partly in section, of the blind rivet according to FIG. 11 as seen from the left, FIG. 13 is a lateral view, partly in section of a fourth variant of the blind rivet according to the invention and formed with an air-tight rivet sleeve, and FIG. 14 is a lateral view, partly in section, of the blind rivet according to FIG. 13 as seen from the left.

DETAILED DESCRIPTION

Figure 1:
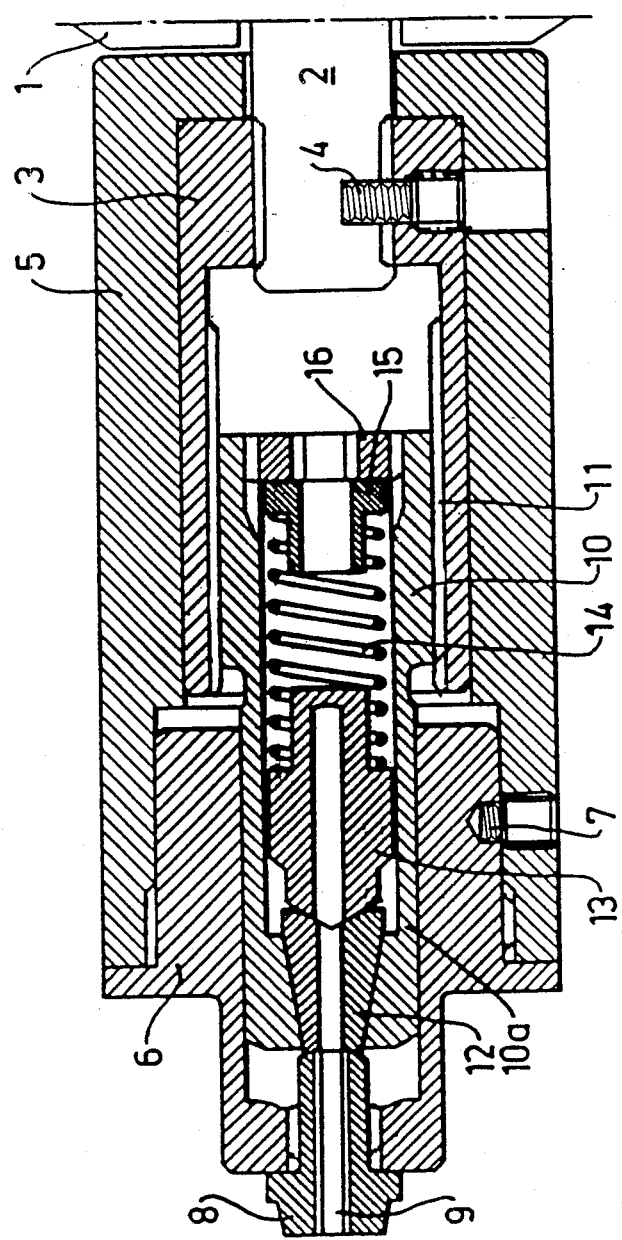
FIG. 1 is a longitudinal section of a tool embodied according to the invention.
Figure 7:
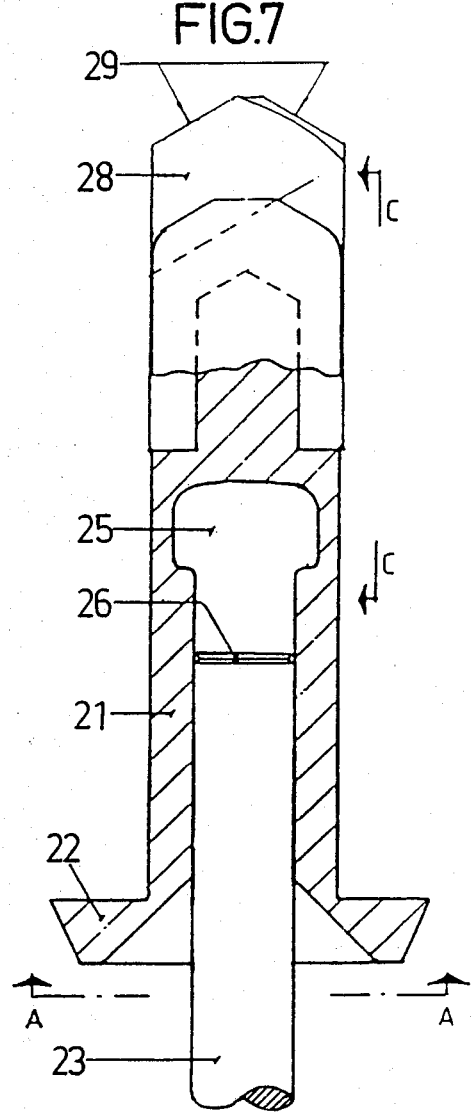
FIG. 7 is a lateral view, partly in section, of another variant of a blind rivet according to the invention in an air-tight variant.
Figure 8:
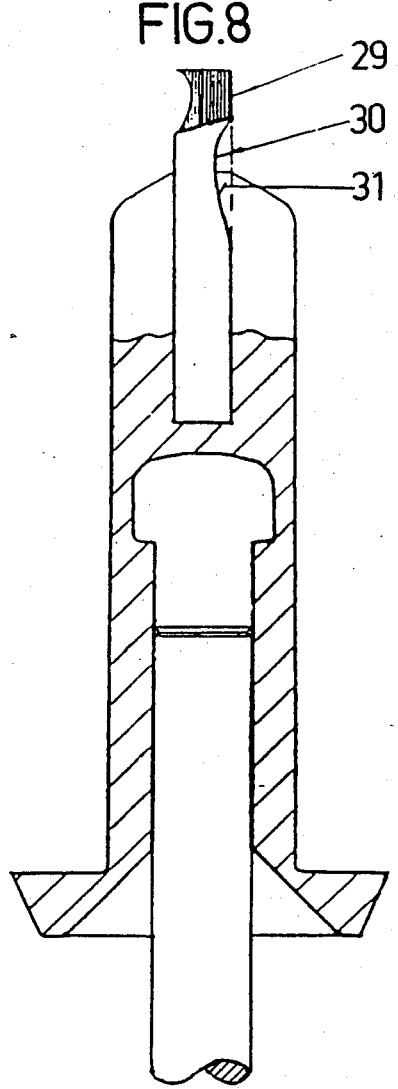
FIG. 8 is a lateral view of the blind rivet in FIG. 7 as seen from the left therein.

The tool shown in FIG. 1 is intended to be used in a preferably electrically operated screwing machine 1 reversible for right- or left-hand operation. However, the machine can also consist of a machine operated hydraulically or by means of compressed air. On the driving axle 2 of the screwing machine 1 there is arranged an inner sleeve 3 which is screwed onto the driving axle 2, preferably by means of threads, and which is connected non-rotatably with the driving axle 2 in mounted position by means of a locking screw 4. This inner sleeve 3 is internally surrounded by an outer mantle 5 which at its end facing away from the driving axle is provided with a front end sleeve 6 arranged detachably in the outer mantle and connected non-rotatably with the outer mantle 5 by means of a locking screw 7. In the front portion of the end section 6, a replaceable nozzle 8 is screwed, which has a through hole 9 of a cross-section with preferably many edges, for reasons described more in detail below. The end section 6 is internally hollow and this cavity has preferably a square cross-section. A complementary end portion 10a of a drawing member 10 projects into this cavity for axial sliding movement relative thereto. The other end of the drawing member 10 is connected with an internal thread in the inner sleeve 3 by means of an external thread 11. The thread of the drawing member 10 and in the inner portion 3 is left-handed for reasons described more closely below. At its front portion the drawing member 10 is formed to be tapering and bearing upon two conical drawing chucks 12 which have a through passage for a rivet pin between themselves. Inside of the drawing chucks 12 a receiving member 13 is arranged in an internal cavity in the drawing member 10, said receiving member bearing upon the drawing chucks 12 and loaded against these by means of a spring 14 attached to the rear portion of the drawing member 10 by means of a pressure plate 15 and a nut 16.

Figure 9:
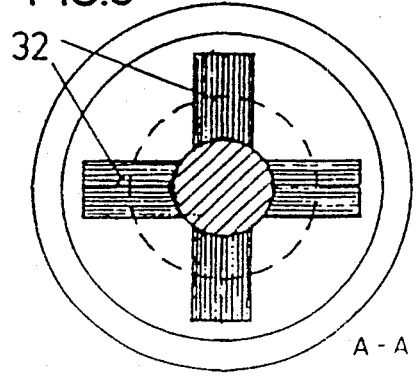
FIG. 9 is a view according to the arrows A—A in FIG. 7 showing the collar portion of the rivet sleeve.
Figure 10:
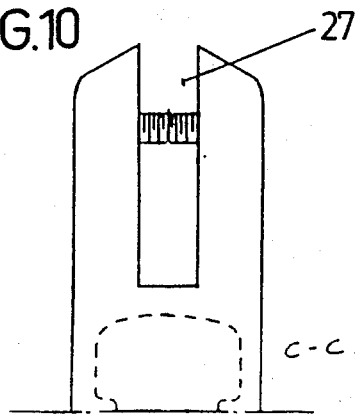
FIG. 10 shows a portion C—C according to the arrows in FIG. 7 showing the end portion of the rivet sleeve with the drill bit removed.

When using the tool, a rivet is entered with its upsetting pin through the hole 9 of the nozzle 8 so that the rivet will bear upon the nozzle 8 with its pre-shaped flange. The rivet used is preferably but not necessarily provided with a drill point and an upsetting pin preferably with several edges, adapted to the passage 9 in the nozzle 8 and projecting therein. If the rivet is provided with a self-drilling point the driving axle 2 is put in right-hand rotation, the whole tool will rotate in this direction. Alternatively, the nozzle 8 can be formed externally as the tip of a cope chisel to engage a cross-shaped groove in the collar portion of a rivet sleeve, such as the collar portion shown in FIG. 9, in order to rotate the rivet sleeve. When the hole is drilled and riveting is to be carried out, the direction of rotation of the driving axle 2 is reversed to left-hand rotation. As the thread 11 of the drawing member 10 and the inner sleeve 3 is left-hand, the drawing member 10 is drawn inwards in the inner sleeve 3 and is prevented from rotation as the sliding portion 10a of drawing member is square and projects into the square cavity in the end portion 6. The tapering portion of the drawing member 10 will then clamp the chuck jaws 12 which are thus pressed against the rivet pin, engage this and draw it inwards, the outer mantle 5 also being drawn backwards until it abuts the outer casing 1 of the machine. The outer mantle 5 is then prevented from further rotation. On the other hand, the drawing member 10 can be further displaced into the inner sleeve 3 until the rivet has been compressed and pulled off. After this, the direction of rotation of the driving axle 2 is again reversed to right-hand rotation and one grasps with one's hand the outer mantle 5 to prevent this from rotation. The drawing member 10 is then displaced outwards again, the chuck jaws 12 being pressed apart by the receiving member 13 and released from the portion of the rivet. If the tool is then directed downwards, the remainder of the pin portion of the rivet will fall out and a new riveting operation can be started.

Thus, the tool of the present invention has been given a simple construction, making it possible to manufacture the tool relatively cheaply and, moreover, it is reliable in use. If the tool is to be used for screw driving or other tasks in machines where left-hand operation can be required, the outer mantle 5 can be locked onto the inner sleeve 3 by screwing-out the locking screw 4 some turns in order to connect these portions non-rotatably with each other. Of course, the tool can also be formed as a special machine merely intended for rivet drawing and drilling in connection with drawing of self-drilling blind rivets.

Thus, in FIGS. 2-6 a blind rivet according to the invention is shown which comprises a rivet sleeve 21 provided with a radially outwardly-extending annular collar portion 22. An upsetting pin 23 is passing through the central longitudinal bore in the rivet sleeve 21, which pin is provided with a rotational wing 24 outside the collar portion to enable turning of the upsetting pin 23. At its other end, projecting from the rivet sleeve 21, the upsetting pin 23 is provided with an enlarged main portion 25 having approximately the same outside diameter as the sleeve portion of the rivet sleeve 21. The enlarged main portion 25 is integral with the remainder of the upsetting pin 23, but it is provided with a weakened section 26, immediately below the enlarged main portion, at which the main portion can be separated from the upsetting pin after tightening the rivet. A slot 27 for receiving a detachable cutting insert 28 is made in the enlarged main portion 25. The cutting insert 28 has a cutting edge 29 and a recess arranged below the cutting edge 29, which is best apparent from FIGS. 2 and 3. The main portion 25 is also preferably formed with a clamped-in member 31 projecting into the slot 27 and engaging the recess 30 of the cutting insert 28 in order to secure the cutting insert in the main portion. As is apparent from FIGS. 5 and 6, but also as is indicated with a dashed line in FIG. 2, the bottom of the slot 27 can be roof-shaped, and the cutting insert 28 has a bottom adapted to this shape for further securing the cutting insert in the main portion. The width of the loose cutting insert 28 is somewhat greater than the diameter of the main portion 25 and the sleeve portion of the rivet sleeve 21.

The cutting insert 28 is made of another material than that of the rivet sleeve and upsetting pin and can consist of an insert of, e.g., drill steel, or can be made from a pulverulent material and then pressed into a suitable form.

The blind rivet shown in FIGS. 7-10 also has a detachable cutting insert 28. However, in this case, the pin 23 does not pass the rivet sleeve 21 completely but the rivet sleeve here encloses the enlarged main portion 25 of the upsetting pin, which has here a diameter that is less than the diameter of the rivet sleeve. Thus, this rivet is an air-tight rivet, and the loose cutting insert 28 is directly attached to the end of the rivet sleeve 21. The embodiment of the cutting insert is substantially the same as in the embodiment according to FIGS. 2-6, the bottom of the cutting insert however, having a somewhat different appearance, as is apparent from FIG. 7, and the slot 27 which is here formed in the end of the rivet sleeve 21, is also formed in another way in order to correspond with the cutting insert. Because the upsetting pin 23 is not to be rotated in this case in order to provide the drilled hole in which the rivet will be installed, but the rivet sleeve 21 itself. A cross-shaped groove 32 is then formed in the collar portion 22 of the sleeve, as is apparent from FIG. 9, in which groove a suitable turning tool can engage.

In FIGS. 11 and 12, there is shown a third embodiment of a blind rivet according to the invention, substantially corresponding to the blind rivet shown in FIGS. 2-6, with the difference being that no loose cutting insert is concerned here, but the enlarged main portion 25 of the upsetting pin is instead formed to have a cutting edge 29 coated with a pulverulent material having cutting properties.

In FIGS. 13 and 14, a fourth variant of a blind rivet according to the invention is shown, which substantially corresponds to the variant shown in FIGS. 7-10, with the difference that no detachable cutting insert is arranged here, either, but also here, the end portion of the rivet sleeve has been formed to a cutting edge 29 coated with a pulverulent material having cutting properties.

Common to all the blind rivets shown in the figures, is that the cutting means is made of another material than that of the rivet sleeve and the upsetting pin. The cutting means can be a loose cutting insert of, e.g., drill steel or can be made of a pulverulent material, for example silicon carbide which, thus, can either be pressed to form a cutting insert, or be coated on the end of the rivet or the upsetting pin. Nor is it necessary, since the pulverulent material is coated directly on the rivet sleeve, that the rivet sleeve is then formed so as to have a cutting edge, but it is also possible, in certain cases, to apply the cutting pulverulent material directly on a substantially planar end surface of a rivet. How the cutting pulverulent material is to be arranged is dependent on the material in the rivet is intended to be installed. Due to the use of a cutting means of another material than that of rivet sleeve and upsetting pin in order to create a cutting effect, it is possible to use light metals, both in the rivet sleeve and the upsetting pin, materials which cannot be used if a cutting effect is to be obtained directly with the metal and rivet sleeve. As well, as the upsetting pin can be made of, for example, aluminium.

In the drawing figures rotational wings on the upsetting pin have been shown as well as one cross-shaped groove in the collar portion of the rivet sleeve in order to obtain the required rotation of the rivet for achieving drilling. In these cases the tool being used must be provided with corresponding engagement means to turn the rivet and/or the upsetting pin by means of a rotational wing or a cross-shaped groove. However, these means providing rotation can also be embodied in many other different ways as is obvious to one skilled in the art.

What is claimed is:

1. A tool for installing a blind rivet which has an upsetting pin, comprising:
    a machine tool having a reversingly rotary output shaft protruding from a stationary casing;
    an inner sleeve mounted to said rotary output shaft for rotation therewith;
    an outer mantle radially surrounding and extending axially outwardly of said inner sleeve;
    said outer mantle, coaxially with but axially outwardly from said rotary output shaft, being provided with a nozzle having an axial throughbore shaped to axially receive an upsetting pin of a blind rivet;
    a drawing device housed in said nozzle coaxially behind said nozzle, said drawing device including a conical set of expansible-contractile chuck jaws, and a drawing member engaged with said chuck jaws for radially contracting said chuck jaws, when moved in one axial direction relative to said chuck jaws and for permitting said chuck jaws to radially expand, when moved in an axially opposite direction relative to said chuck jaws;
    an elongated drawing member having an axially inner end portion and an axially outer end portion; said axially inner end portion being threadedly engaged with said inner sleeve, so that when said inner sleeve is rotated in one angular sense relative to said drawing member, said drawing member axially extends towards said nozzle and when said inner sleeve is rotated in an opposite sense relative to said drawing member, said drawing member axially retracts towards said rotary output shaft; said axially outer end portion being engaged with said outer mantle for rotation and non-rotation therewith, and for axial extension and retraction with respect thereto without rotation relative thereto; said axially outer end portion further having internally conical surface means being positioned for surroundingly engaging said chuck jaws for radially contracting said chuck jaws when said drawing member is axially retracted towards said rotary output shaft;
    means associated between said chuck jaws and said drawing member for tending to radially outwardly spread said chuck jaws as said drawing member is extended towards said nozzle;
    said axial throughbore of said nozzle having surface means adapted for engagement with wings of a rivet for causing the rivet, where so engaged, to rotate and to remain non-rotated with said nozzle;
    said outer mantle having an inner end portion adapted to retract towards and become engaged with said casing of said machine tool for non-rotation therewith, upon rotation of said rotary output shaft in a sense for also providing axial retraction of said drawing member towards said rotary output shaft,
    whereby, when a rivet having:
        an upsetting pin provided at an axially intermediate location with radially outwardly projecting wings;
        a sleeve with a tubular barrel having a radially outwardly projecting collar at one end, the sleeve being disposed about said pin axially beyond said wings;
        an enlarged main portion of said pin axially protruding out of said barrel of said sleeve, one of said enlarged main portion and said sleeve, axially beyond an opposite end of said barrel being provided with a cutter on an axially outer end thereof; and
        said pin having a weakened section extending across said pin at a location intermediate said wings and said enlarged main portion,
    is inserted, upsetting pin first, through said throughbore of said nozzle until said upsetting pin is received in said chuck jaws, said wings are engaged by said surface means of said nozzle, and said collar engages externally said nozzle, said cutter on said axially outer end is engaged with a substrate at a location where the rivet is to be installed, and said rotary output shaft is rotated in a first direction while said outer mantle is permitted to rotate, said outer mantle rotates said rivet, causing said cutter to bore through said substrate placing said collar against a front face of said substrate, whereupon, upon rotation of said rotary output shaft in a reverse direction, said outer mantle engages said casing of said machine tool and ceases rotation, whereupon said drawing member retracts causing said chuck jaws to grip and pull on said upsetting pin, whereupon said enlarged main portion upsets said sleeve against a rear face of said substrate and said upsetting pin fractures at said weakened section, and, thereafter, rotation of said rotary output shaft again in said one direction extends said drawing member, thereby permitting said chuck jaws to open away from a remaining portion of said upsetting pin, so said remaining portion may be expelled from said nozzle in order to ready said to for installing another, like rivet.

2. A tool for installing a self-drilling blind rivet or an ordinary blind rivet having an upsetting pin, said tool comprising:
    an outer mantle,
    an inner sleeve disposed coaxially within said mantle and rotatable relative thereto, said sleeve being attachable at a location at one end of said mantle to a rotatable driving axle of a rotary-output electric hand tool,
    a nozzle connected coaxially to the opposite end of said mantle for rotation therewith, the nozzle having a hole for slidably receiving a rivet with its upsetting pin, and the nozzle being adapted to rotate a rivet received in the nozzle,
    a drawing device disposed coaxially within the inner sleeve, said drawing device including two conical drawing chucks for clamping engagement with a rivet pin,
    a sleeve-like drawing member surrounding and engageable with the chucks, said drawing member having external threads at one end engaged with complementary internal threads on the inner sleeve, the other end of said drawing member being non-cylindrical and fitted into a complementary cavity in said mantle for axial sliding movement relative to the cavity, the arrangement and cooperation of the chucks, drawing member, inner sleeve and outer mantle being such that axial movement of the drawing member towards said one end of said mantle when effected by rotation of the inner sleeve in a first direction forces the chucks to clamp against a rivet pin whereby the rivet pin moves axially with the drawing member and such that rotation of the inner sleeve in an opposite direction results in rotation of the drawing device, said mantle and the nozzle so that a rivet received in the nozzle rotates.

* * * * *